Patented Jan. 19, 1937

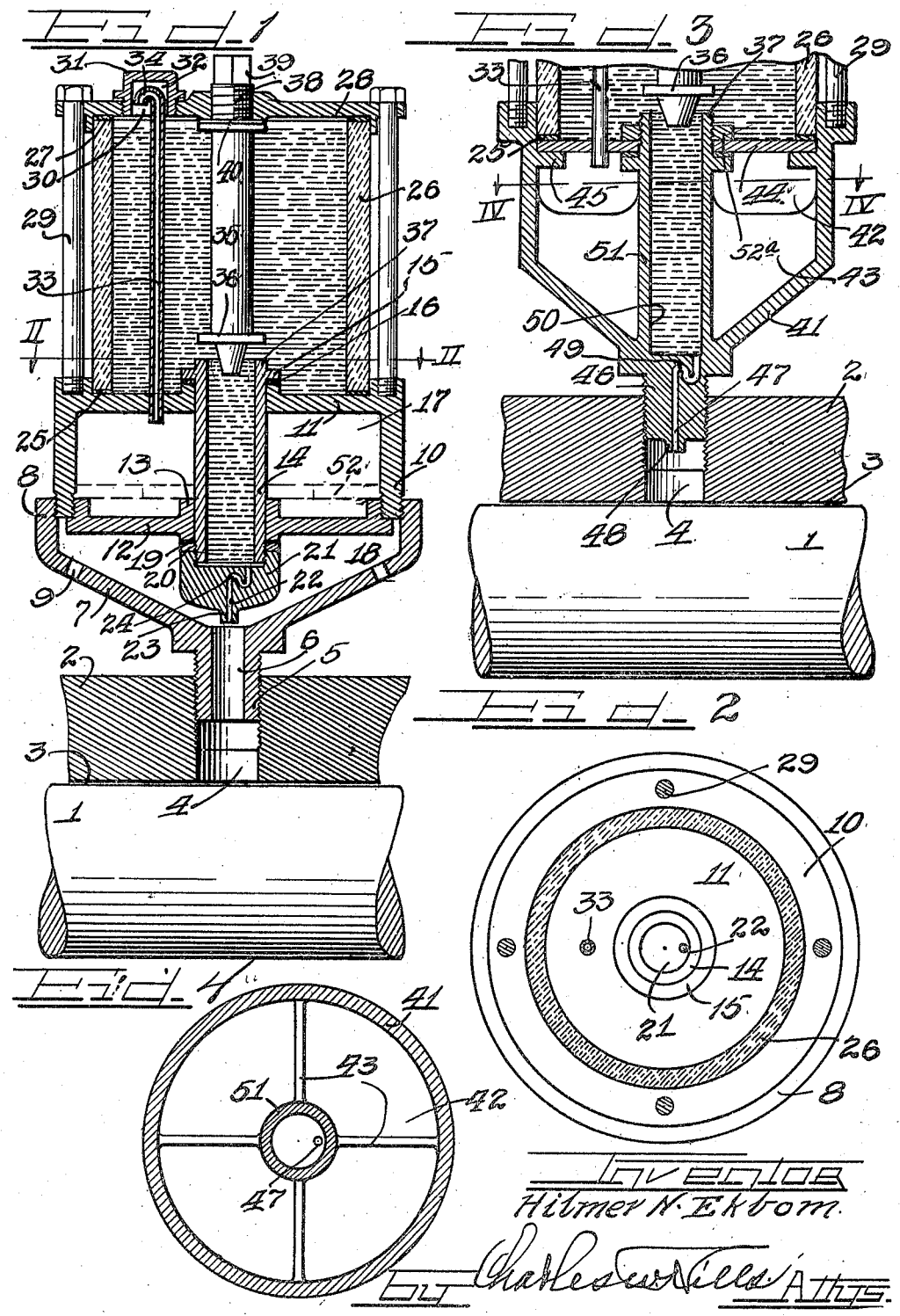

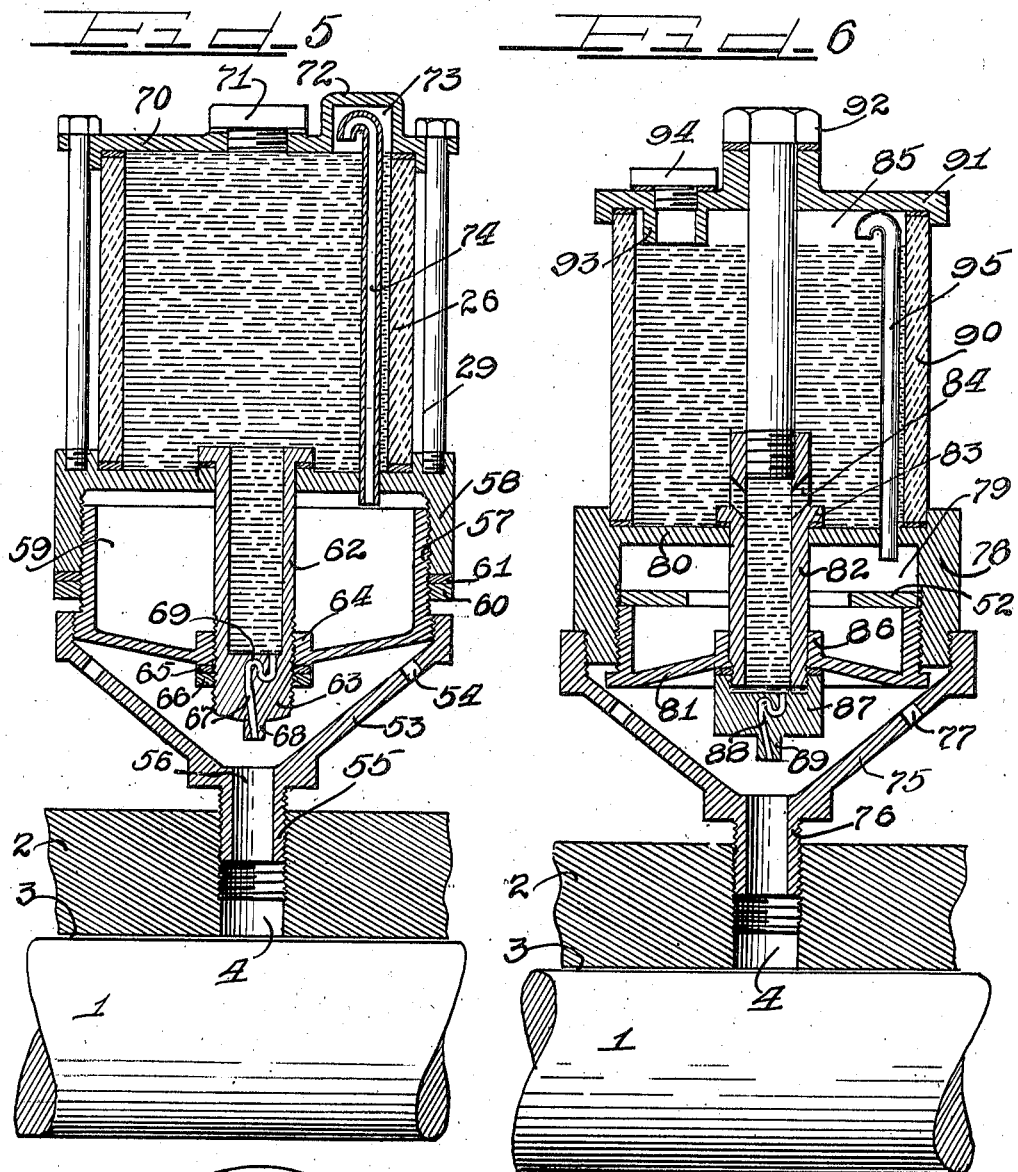

2,068,168

UNITED STATES PATENT OFFICE 2,068,168

AUTOMATIC LUBRICATOR

Hilmer N. Ekbom, Chicago, Ill.

Application September 27, 1934, Serial No. 745,676

21 Claims. (Cl. 184—84)

The present invention relates to improvements in automatic lubricators and more particularly to bearing lubricators including an automatic feed which is controlled by the temperature of the bearing on which the lubricator is mounted.

It is an object of this invention to provide a lubricator having a thermodynamic control for governing the discharge of a lubricant to a bearing, said thermodynamic control being sensitive to the temperature variations in the bearing.

It is also an object of this invention to provide a lubricator in which the feed of lubricant to a bearing is independent of the amount of lubricant contained in the lubricator, said lubricator including a feeding device by which it is possible to feed a certain amount of lubricant to the bearing between the period of temperature increases to prolong the stability of the lubricant film in the bearing.

It is a further object of the invention to provide a lubricator wherein the feed of lubricant to the bearing, on a rise of temperature in the bearing, can be predetermined by the adjustment of an adjustable feed means wherein the capacity of the air control chamber may be varied.

It is furthermore an object of this invention to provide a lubricator with a lubricant reservoir having an extension which is not visible, so that when the main reservoir appears empty, there is still a reserve supply of lubricant for lubricating the bearing in case the lubricator is not promptly refilled.

Another object of the invention is to provide a lubricator having means for cutting off the feed due to atmospheric or other temperature variations when the lubricator is not in use.

It is furthermore an important object of this invention to provide a lubricator wherein a lubricant supply reservoir is positioned above an air containing control housing surrounding a lubricant reserve extension provided with a discharge nozzle including a trap outlet passage the outlet end of which terminates in a discharge nipple constructed to obviate the accumulation of lubricant at the end of the discharge opening, said lubricator including means for varying the volume of the air chamber and a means for establishing communication between the air chamber and the upper portion of the lubricant reservoir for the purpose of having the feed of lubricant from the lubricator automatically controlled by variations in temperature of the bearing.

Other and further important objects of the invention will be apparent from the disclosures in the specification and the accompanying drawings.

The invention (in a preferred form) is illustrated in the drawings and hereinafter more fully described.

On the drawings:

Figure 1 is a longitudinal vertical center section of an automatic lubricator, with parts shown in elevation, said lubricator embodying the principles of this invention and having the supporting end thereof engaged in a bearing to be lubricated.

Figure 2 is a transverse detail sectional view taken on line II—II of Figure 1 with the lower end of the valve 35 omitted.

Figure 3 is a fragmentary vertical central section of a modified form of lubricator shown supported on a fragmentary portion of a bearing and having the upper portion of the lubricator broken away since the construction of the omitted parts is identical with that illustrated in Figure 1.

Figure 4 is a transverse detail section taken on line IV—IV of Figure 3.

Figure 5 is a longitudinal vertical central sectional view of another modified form of automatic lubricator including an adjustable air chamber housing.

Figure 6 is a longitudinal vertical central sectional view of another modified form of automatic lubricator, having parts shown in elevation, and including means for varying the capacity of the air chamber.

Figure 7 is a top plan view of a removable ring insertable in the air chamber for changing the volume thereof for the purpose of predetermining the amount of lubricant delivered from the lubricator.

As shown on the drawings:

Referring to the form of the device illustrated in Figures 1 and 2 the reference numeral 1 indicates a bearing shaft rotatably engaged in a bearing housing 2 having bearing journal 3 which is to be lubricated. The bearing housing 2 is provided with a tapped hole 4 which is internally threaded for the reception of a threaded shank or lubricant delivery pipe 5 having a discharge passage 6 formed therein for discharging a predetermined amount of lubricant through the hole 4 to the bearing journal 3 to be lubricated.

The supporting shank or pipe 5 is integrally formed on the lower tapered end of a conically shaped bottom or base 7 having an internally threaded round or cylindrical rim 8 forming the upper end thereof. The base 7 has a plurality of openings or holes 9 provided therein for air circulation. Securely threaded into the ring flange 8 of the base 7 is the lower threaded end of a metal housing 10 the upper end of which is closed by a top closure plate 11 having a central opening therein. The lower end of the housing 10 has secured therein a bottom closure plate 12 provided with a central opening surrounded by a collar 13. The lubricant reserve reservoir or tube 14 projects downwardly through the central opening in the top plate 11 and has a flange or collar 15 integrally formed near the upper end thereof to support the same on the housing top plate 11. Engaged between the flange 15 and a boss formed on the housing top plate 11 is a gasket 16. The lubricant reserve reservoir or tube 14 projects downwardly through the housing 10 and through the air control chamber 17 of the housing 10, and continues downwardly through the collar 13 with the lower externally threaded end of the tube 14 projecting into the air circulating chamber 18 of the base unit 7. The lubricant reserve reservoir or tube 14 is tightly clamped in position by means of a gasket 19 and a lock nut or ring 20 which is threaded on the lower extending end of the tube 14. Tightly threaded on the lower end of the reserve reservoir or tube 14 below the lock nut 20 is a lubricant discharge head or nozzle 21 having a lubricant feed tube or passage 22 formed therein with the upper end of the passage communicating with the interior of the tube 14 while the lower end of the passage terminates in the lower end of the reduced tip or nipple 23 having a small bottom surface to obviate the accumulation of the lubricant on the lower end of the discharge nozzle to prevent the irregular supply of lubricant when not required. The feed passage 22 intermediate its ends is provided with a curved or trap section 24 to prevent the downward discharge of lubricant through the passage 22 due to the shaking or jarring of the lubricator. Attention is called to the fact that the diameter of the feed passage 22 is small so that air cannot bypass fluid lubricant in the passage.

Seated upon the top plate 11 of the housing 10, on a washer or gasket 25, is the lower end of a main lubricant supply reservoir or casing 26 constructed of glass or any other suitable transparent material. Seated on the upper end of the main reservoir 26 is a packing or gasket 27 upon which a reservoir cover or top plate 28 is seated. The reservoir cover 28 is provided with a plurality of marginal apertures through which bolts 29 project and have the lower threaded ends thereof threaded into apertures in the top of the housing 10 to tightly clamp the reservoir and the cover plate thereof upon the housing. The cover plate 28 of the lubricant reservoir is provided with a filler opening 30. Removably engaged in the filler opening 30 is a cap or hood 31 having an air chamber 32 therein. For the purpose of establishing communication between the air chamber 17 in the housing 10 and the air chamber 32 in the cap 31 a pipe or tube 33 extends through the reservoir 26 and has the lower end thereof projecting through an aperture in the top plate 11 of the housing 10 into the air chamber 17. The upper end of the tube 33 is curved or bent to form a hook shaped head 34 which is positioned in the chamber 32 of the cap 31.

For the purpose of closing the upper end of the reserve reservoir 14 when the lubricator is not in use a valve stem 35 is mounted in the main reservoir 26 and has a flange valve 36 formed near the lower end thereof to seat upon the valve seat 37 provided on the upper end of the auxiliary reservoir 14. The upper end of the valve stem 36 is provided with a threaded section 38 terminating in a nut head 39. Formed on the valve stem 35 to the inside of the threaded section 38 is a stop flange 40 having a gasket or washer seated thereon for engagement against the inner face of the reservoir cover 28 to form an airtight joint when the valve 36 is in an open position as illustrated in Figure 1.

Figures 3 and 4 illustrate a modified form of auotmatic lubricator the upper lubricant reservoir section of which is substantially the same as that illustrated in Figure 1. In this modified form of the lubricator a base section 41 is provided with an air chamber 42 divided by means of a plurality of webs or partitions 43 which extend from the bottom of the base 41 upwardly to about half of the height of the base section. The base 41 has the upper end thereof closed by means of a closure plate or top disc 44 which seats on lugs or shoulder pieces 45 formed within the housing. The main reservoir 26 and its bottom gasket 25 are seated upon the closure plate 44. The closure plate 44 is provided with an aperture to permit the air tube 33 to project downwardly so that the lower end thereof communicates with the air chamber 42. Integrally formed on the lower end of the housing 41 is a solid supporting shank 46 which is exteriorly threaded to permit the same to be threaded into the opening 4 of the bearing housing 2. A lubricant feed passage 47 is provided in the supporting shank 46 and has the lower end thereof terminating in a tip or nipple 48. The lubricant discharge passage 47 is irregular in shape and is provided with an S-shaped trap 49. The upper end of the lubricant discharge passage 47 communicates with the lower end of a reserve lubricant chamber 50 provided in the reserve or emergency tube or casing 51 which is integrally formed axially within the housing 41. The upper end of the lubricant reserve tube or casing 51 projects through a central opening in the cover plate 44. The closure plate 44 is tightly held in position by means of a lock nut 52ª.

When it is desired to change the rate of feed of the lubricant under normal conditions, for different bearing sizes or loading conditions, this can be done by increasing or decreasing the volume of the air chamber 17 in the device shown in Figure 1 and the air chamber 43 of the device disclosed in Figure 3. The method of changing the volume of the air chamber is accomplished by means of volume change rings 52 of the type illustrated in Figure 7. One or more of the rings 52 may be placed in the chamber 17 to reduce the volume thereof or the volume may be increased by removing one or more of the rings. In a similar manner the volume change rings 52 may be engaged in the air chamber 42 or removed therefrom when it is desired to change the volume of the air chamber 42 in the form of the device illustrated in Figure 3.

Referring now to Figure 5 another modified form of an automatic lubricator is illustrated.

In this form of the device the reference numeral 53 indicates a conical base section having air circulating apertures 54 provided therein. Integrally formed on the lower tapered end of the base section 53 is a supporting shank or stem 55 having a lubricant discharge passage 56 provided therein. The supporting shank 55 is exteriorly threaded to permit the shank to be threaded into an opening 4 provided in a bearing housing 2. Supported in the upper end of the base section 53 is a two-section housing comprising a lower housing section 57 and an upper housing section 58 which are adjustably threaded onto one another and are provided with an air chamber 59 the volume of which may be varied by adjusting the upper housing section 58 with respect to the lower housing section 57. For holding the upper and lower housing sections 57 and 58 secured in an adjusted position a lock nut ring 60 and a gasket 61 are engaged around the lower housing section 57 to seat against the lower end of the upper housing section 58, to provide an air-tight joint between the two adjustable sections of the housing. Projecting downwardly through an opening in the top wall of the upper housing section 58 is a lubricant reserve tube or auxiliary housing 62 the upper end of which is open to communicate with the interior of a main lubricant reservoir or casing 26. The upper end of the reserve reservoir 62 is provided with a flange to hold the reserve reservoir supported in position. The lower end of the reserve reservoir 62 is provided with an exteriorly threaded discharge head or nozzle 63 which is threaded through an interiorly threaded collar 64 formed in the middle portion of the bottom wall of the lower base section 57 of the air chamber housing. A gasket 65 and a lock nut 66 surround the lower portion of the nozzle 63 for holding the reserve reservoir 62 clamped in position. A lubricant feed or supply passage 67 is provided in the nozzle 63 and has the lower discharge end thereof terminating in a tip or nipple 68 of reduced size to obviate the accumulation of the lubricant around the outlet of the passage 67. The feed passage 67 is provided with a trap 69 to prevent the accidental discharge of lubricant through the passage 67. The diameter of the lubricant feed passage 67 is small so that air cannot bypass the fluid lubricant in the passage.

A main lubricant housing 26 which is constructed of glass or other transparent material is clamped in position by means of clamping bolts 29 which project downwardly through apertures in a reservoir cover 70 seated on the upper end of the casing 26. The lower threaded ends of the bolts 29 are threaded into threaded apertures provided in the top surface of the upper housing section 58. The reservoir cover 70 is provided with a filler opening which normally is closed by means of a closure plug 71. Integrally formed on the closure plate 70 is a hood 72 provided with an air chamber 73 in which the hooked or curved upper end of an air tube 74 is engaged. The air tube 74 projects downwardly through the main lubricant housing 26 and the lower end of the air tube projects through an opening in the top wall of the upper housing section 58 to permit the lower end of the tube to communicate with the air chamber 59.

Figure 6 illustrates another modified form of automatic lubricator. In this form of the device a base section 75 is provided with the lower end thereof formed with an integral exteriorly threaded supporting shank or tube 76 which is threaded into the opening 4 of the bearing housing 2. The base section 75 is provided with a plurality of air circulation openings 77. Threaded into the upper interiorly threaded end of the base section 75 is an upper housing section 78 provided with an air chamber 79 and with a top closure plate 80. Threaded into the lower end of the upper housing section 78 is a lower housing section 81 which closes the lower end of the air chamber 79. Projecting downwardly through an opening in the upper wall 80 of the upper housing section 78 is a reserve or auxiliary lubricant reservoir or tube 82 provided with a supporting flange 83. Provided in the upper end of the reserve lubricant reservoir or tube 82 are a plurality of openings 84 to permit lubricant from the lubricant chamber 85 to pass into the auxiliary lubricant tube or reservoir 82. The lower end of the auxiliary lubricant reservoir 82 projects through a collar 86 provided in the bottom wall of the lower housing section 81 and has the lower projecting end thereof closed by means of a solid head or nozzle 87 having a lubricant supply passage 88 formed therein. The lower end of the lubricant feed passage 88 terminates in a reduced tip or nipple 89 while the upper end of the passage 88 communicates with the interior of the auxiliary lubricant supply reservoir 82. Seated upon the upper housing section 78 is a glass or transparent main lubricant reservoir 90 the upper end of which is closed by a cover plate 91 which together with the main reservoir 90 is held in place by means of a clamping bolt 92 which projects downwardly through a passaged collar provided on the cover plate 91 and has the lower end thereof threaded into the upper interiorly threaded end of the auxiliary lubricant reservoir 82. The main reservoir cover plate 91 is provided with a filler sleeve 93 adapted to be normally closed by means of a screw plug 94. An air tube 95 is mounted within the main reservoir 90 and said air tube has the lower end thereof projecting through an opening in the top wall of the top section 78 of the air chamber housing. The upper end of the air tube 95 is bent over or hook shaped and is positioned in the upper end of the reservoir 90 with the upper end of the air tube positioned above the top level of the lubricant within said reservoir.

Having described the various forms of the improved automatic lubricator illustrated in the drawings the operation of these devices will now be described.

By removing the filler cap 31 the main lubricant reservoir 26 and the auxiliary reservoir 14 communicating therewith are filled with a lubricant through the filler opening 30. By positioning the upper hooked or curved head end 34 of the air tube 33 in the cap 31 the reservoirs may be filled with a lubricant up to the top of the main reservoir 26 to completely fill the same. An air space is thus provided in the filler cap chamber 32. The air space 32 acts to prevent lubricant from being sucked into the air tube 33. The lubricant completely fills the main reservoir 26 and the auxiliary reservoir 14, and passes downwardly into the feed or discharge passage 22 due to the action of gravity. When the filler cap 31 is tightly in position the air pressure in the cap chamber 32 and in the air chamber 17 will decrease to a point below atmospheric pressure depending on the height of lubricant from the lowest end of the discharge passage 22, to the upper level of the lubricant in the main reservoir 26, and on the capillary attraction of the tubes 14 and 22. When this point in the air pressure is reached equilibrium is established and no more lubricant will flow through the discharge passage 22 because no air can be supplied through the passage 22 when it is filled with lubricant since the diameter of the passage is of such proportion that air cannot bypass the lubricant in the passage.

When the temperature of the bearing unit increases due to the rotation of the shaft in the bearing housing 2 the temperature in the bearing housing opening 4 and in the supporting shank opening or passage 6 will rise to substantially the same degree as the temperature at the bearing journal 3. The heated air will rise and pass into the base chamber 18 and escape through the air circulation openings or apertures 9. The heated air entering the chamber 18 contacts and heats the bottom plate 12 of the air chamber housing 10 and since the bottom plate 12 is constructed of a good conductor of heat such as copper the temperature of the air in the air chamber 17 will quickly increase to substantially the temperature at the bearing journal 3 causing a corresponding amount of increase in volume of the air in said chamber 17.

The temperature of the air in the chamber 17 is thus governed by the temperature at the bearing journal and affords a thermo-dynamic control whereby the increased air pressure of the air in the chamber 17 will be transmitted to the air in the cap chamber 32 through the air tube 33 to cause the lubricator to discharge lubricant through the discharge or feed passage 22 through the aligned passages 6 and 4 directly to the bearing journal 3. As the discharge of lubricant to cool the bearing journal will continue until the original air pressure is restored in the chambers 17 and 32 it will be seen that the amount of lubricant discharged is equal to the increase in air volume in air chamber 17. As this increase in air volume in chamber 17 is in direct proportion to the volume of the air chamber 17 and the temperature increase, it will be seen that for a certain temperature rise the amount of lubricant discharge to the bearing is always, under normal conditions, constant as long as the volume of the air chamber 17 is kept constant. The rate of lubricant feed, due to temperature rise in the bearing, is therefore, under normal conditions, independent of the amount of lubricant contained in the lubricator reservoir.

Should, on the other hand, the bearing for some abnormal reason, become overheated, the entire lubricator will be heated and, therefore, the air volume above the lubricant will be expanded as well as the lubricant itself, and a corresponding increase in the rate of the lubricant feed will then be effected, which is a desired feature in a lubricator.

In case it is desired to change the rate of feed under normal conditions, for different bearing sizes or loading conditions, this can be done by increasing or decreasing the volume of the air chamber 17. One simple method of doing this is by inserting or removing volume change rings 52 in the types of lubricators illustrated in Figures 1, 3 and 5. By inserting these rings to reduce the volume of the air chamber by one-half, the rate of discharge of the lubricant from the lubricator will be cut in half. In the form of the lubricator illustrated in Figure 5, the volume of the air chamber 59 for varying the rate of discharge of the lubricant, may be obtained by raising or lowering the adjustment of the upper housing section 58 with respect to the lower housing section 57. The rate of lubricant discharge may also be controlled by constructing the air chamber bottom plate 12 of different kinds of metal with different heat conducting characteristics or by using bottom plates of different thicknesses. Another simple method of varying the rate of discharge of the lubricant from the lubricator consists in using the same metal of which the bottom plate of the air chamber was originally constructed and placing an insulating means on the upper or inner surface such as a thin layer of oil which will act to reduce the discharge rate of the lubricant because oil is a poor conductor of heat so that the rate of heating of air in the air chamber will be less than the temperature rise at the bearing journal 3.

When a quantity of lubricant has been delivered to the bearing journal 3 to increase the oil film in the bearing journal, the friction is decreased thereby causing a drop in temperature. This cooling off of the journal acts to cause a drop in temperature of the bottom plate 12 of the air chamber housing to cause a lowering of the temperature of the air in the chamber 17 to cause a contraction of the air in said chamber. By means of the air tube 33 the pressure of the air in the cap air chamber 32 will also be reduced the same amount, thereby causing the lubricant in the feed passage 22 to be sucked into the auxiliary reservoir 14.

Assuming the reservoir to have been filled with lubricant and the cap 31 placed thereon, a slight amount of lubricant will be discharged through passage 22 until the pressure in the air chamber 17 and above the lubricant in the reservoir will be equal to atmospheric pressure minus the pressure due to the head of lubricant above the outlet, provided that the outlet 22 is small enough to prevent passage of air and lubricant as hereinbefore specified. Now upon heating of the air chamber 17, a pressure is created above the lubricant to force a portion of the lubricant through the outlet until equilibrium is reached at the point of highest temperature.

Now, upon cooling, the air in chamber 17 will contract and hence the pressure will be reduced, causing atmospheric pressure to force the lubricant back through passage 22 and finally air will enter at the bottom of auxiliary reservoir 14, forming a bubble, and will bubble up through the lubricant. The pressure in the bubble of air can, however, never be more than the pressure above the lubricant minus the pressure due to the head of oil acting thereon, which will then be below atmospheric, until enough air has been admitted to establish equilibrium, that is, the pressure above the lubricant plus the pressure due to the head of oil is equal to the balancing atmospheric pressure.

For the purpose of preventing any lubricant from being shaken out of the feed passage 22 due to jarring or vibration, the feed passage is provided with the trap 24 as illustrated in Figure 1. If a more violent vibration or shaking occurs such as in the case of a crank rod bearing, the feed passage 22 may be given a complete loop.

In the type of lubricator herein described it will be noted that with a temperature rise in the bearing that the lubricator will deliver a predetermined amount of lubricant to the bearing, this amount being constant for given sizes of parts and for a selected capacity of the air chamber 17. The rate of feed of the lubricator is therefore different from that of earlier types of lubricators wherein the rate of feed is controlled by the air volume above the oil level of the reservoir, thereby causing the rate of feed of a lubricant to be increased as the volume of lubricant in the reservoir is decreased. In the present invention, the rate of feed of the lubricant is increased with the rise in temperature of the air in the air chamber 17 in direct proportion to the heating up of the bearing journal the heat of which is transmitted by induction to the air within the chamber 17.

Attention is also called to the fact that with the adjustment feature for governing the capacity of the air chamber 17 by means of the filler rings 52 or by adjustment of the housing sections 57 and 58 with respect to one another in the type of lubricator illustrated in Figure 5, it is possible to adjust the rate of lubricant feed to any bearing size or loading condition.

The lower lubricant containing reservoir or casing 14 serves a double purpose, namely as a container for a reserve supply of lubricant when the main lubricant reservoir 26 appears empty, and furthermore serves as a control for governing to a certain extent the discharge of lubricant through the feed passage 22. Variations in the diameters of reserve tubes will affect the amount of oil discharge, with a decrease in the temperature at the bearing journal 3, between temperature increase periods, since the diameter or size of the auxiliary reservoir controls the size of the air bubble which forms on the upper end of the lubricant discharge passage 22, said air bubble increasing in size with a decrease in the diameter of the reserve reservoir 14.

It has also been found that the amount of lubricant discharge resulting from a temperature decrease at the bearing may be controlled by varying the length of the discharge passage 22. With the exception of certain characteristics of the lubricant, such as thickness or viscosity, the excess of air to replenish oil previously discharged or the amount of oil re-entering the passage 22 can be predetermined by fixing the length and diameter of said passage 22 and the diameter of the reserve reservoir 14.

Attention is called to the fact that there is a possibility that atmospheric temperature changes will cause the lubricator to deliver lubricant on temperature increases and replace the discharged lubricant with air on temperature decreases. To overcome this condition in the case where a bearing is not in service for a period of time, the shut-off valve 36 (Figures 1 and 2) has been provided to be moved into closed position to seat on the valve seat 37, so that the oil reservoir 26 is shut off from the auxiliary oil reservoir 14 thereby stopping the automatic operation of the lubricator.

The operation of the modified forms of automatic lubricators illustrated in Figures 3, 5 and 6 is substantially the same as that described in connection with the lubricator illustrated in Figure 1.

It will of course be understood that various details of construction may be varied through a wide range without departing from the principles of this invention, and it is therefore not the purpose to limit the patent granted hereon otherwise than necessitated by the scope of the appended claims.

I claim as my invention:

1. An automatic lubricator comprising a main lubricant reservoir, an auxiliary reservoir connected therewith and having a restricted lubricant discharge passage leading therefrom, a housing supporting the main reservoir and having a common wall therebetween and an air chamber therein surrounding the auxiliary reservoir and means connecting said air chamber and the main reservoir to produce a discharge of lubricant from the feed passage due to variations in air pressure in the air chamber produced by temperature changes transmitted from a bearing on which the lubricator is mounted.

2. A lubricator comprising a lubricant reservoir having a lubricant feed passage communicating with the interior of the reservoir, a housing surrounding a part of the reservoir with said housing having a closed air chamber therein, a chambered support for the housing having air circulation openings therein, said support including a passaged means for supporting the lubricator on a bearing to be lubricated, and a communicating means between the closed air chamber and the interior of the reservoir.

3. A lubricant supply device comprising a chambered base section having air circulation apertures therein, a passaged shank forming a part of the base section for mounting the device on a bearing to be lubricated, a housing supported on said base section to close the same, said housing having a closed air chamber therein, a main reservoir supported on the housing, an auxiliary reservoir projecting through the housing and surrounded by the air chamber, said auxiliary reservoir communicating with the interior of the main reservoir and having the lower end thereof projecting into the chamber of the base section, said auxiliary reservoir having a lubricant discharge passage formed with a trap with the lower end of the passage positioned to deliver discharged lubricant to the bearing through the supporting shank, communication means arranged between the closed air chamber and the interior of the main reservoir for the transmission of pressure from the closed air chamber to the main reservoir when the air pressure in said air chamber is raised or lowered due to increases or decreases in the temperature in the closed air chamber resulting from temperature changes in the bearing, and means for closing off the auxiliary reservoir from communication with the main reservoir when the device is not in use.

4. An automatic lubricator comprising a chambered supporting base having air circulation apertures therein, a passaged supporting shank forming a part thereof for mounting the lubricator on a bearing or the like, a housing section supported on the base section and closing the upper end thereof, said housing section having a closed air chamber therein, a main lubricant reservoir supported on the housing, communication means between the main reservoir and the closed air chamber in the housing, a reserve lubricant reservoir communicating with the interior of the main reservoir and projecting through the housing air chamber, said reserve reservoir having a trap shaped lubricant discharge passage formed therein and positioned to deliver lubricant through the supporting shank to the bearing on temperature rises in the bearing, and means for varying the capacity of the closed air chamber of the housing for varying the amount of discharge of lubricant from the discharge passage to the bearing.

5. An automatic lubricator comprising a housing having a closed air chamber therein, passaged means for supporting the housing on a bearing to be lubricated, a lubricant reservoir on the housing and having a portion thereof projecting downwardly through the chamber in said housing, an air tube in said reservoir communicating between the housing chamber and the space in the reservoir above the lubricant level, and means for varying the capacity of the air chamber.

6. An automatic lubricator comprising a casing having a partition separating an air-tight lubricant containing chamber and a closed air chamber surrounding an extension of the lubricant chamber, means for equalizing the pressure between the lubricant chamber and said air chamber, removable means to permit filling of the lubricant chamber and a nozzle on the extension having a reduced nipple for discharging lubricant from the lubricant chamber extension when the pressure in the air chamber is changed due to temperature variations transmitted to the air chamber from a mechanism on which the lubricator is mounted.

7. An automatic lubricator comprising an air-tight transparent body and an extension for holding a lubricant, a housing below the body having a closed air-tight air chamber therein surrounding the extension of said body, communication means between the air chamber and the interior of said body, said extension of the body surrounded by the air chamber being non-visible and including a lubricant discharge nozzle provided with a trap passage and also having a reduced discharge nipple for obviating the accumulation of quantities of lubricant on the discharge end of the discharge means.

8. A lubricator comprising a metal housing having a passaged means for supporting the lubricator on a bearing to be lubricated, a partition constructed of a metal having a high heat conductivity, said partition positioned to divide the housing into an air-tight upper chamber and an air circulating lower chamber having air circulating openings leading through the walls of the housing, and lubricant supply means supported on the housing and including an extension projecting through the air-tight chamber into the lower air circulating chamber, the operation of said lubricant supply means being controlled by air volume changes in the air-tight chamber occasioned by temperature changes at the bearing transmitted to the housing and the partition therein for regulating the rate of discharge of lubricant from the lubricator through the passaged supporting means to the bearing.

9. An automatic lubricator comprising a lubricant feed unit, air chambered control means for supporting the same with a device to be lubricated and controlled by temperature rises at the device for determining the amount of lubricant to be discharged from the feed unit, and means for varying the capacity of the air chambered control means.

10. An automatic lubricator including a lubricant reservoir, a housing separated from the reservoir by a wall and having an air-tight chamber and an air circulating chamber therein, means for equalizing the pressure in the air chamber and the interior of the reservoir, and means forming a part of the reservoir leading from the lower part of the reservoir through said air-tight chamber, said means including a nozzle portion projecting into the air circulating chamber and having a trap shaped feed passage therein of such proportions that air cannot bypass lubricant in the passage.

11. An automatic lubricator comprising a lubricant reservoir, an air chambered housing supporting the same, means for transmitting pressure between the air chamber housing and the reservoir, and replaceable inserts for said housing for changing the volume of the air chamber to change the rate of feed of lubricant from the lubricator.

12. An automatic lubricator comprising a lubricant supply reservoir, an air chambered housing including an air-tight chamber and an apertured chamber, said housing supporting the reservoir on a bearing to be lubricated, pressure equalizing means connecting the space above the lubricant in the reservoir with the air-tight chamber of the housing, means for filling the reservoir, means in the apertured chamber for feeding lubricant from the reservoir upon temperature variations of the bearings to be lubricated, and means for stopping the feeding of lubricant at will.

13. An automatic lubricator comprising a housing including a lubricant chamber and air-tight chambers above and below the lubricant chamber, means for connecting the air-tight chambers, a nozzle for controlling the outlet of lubricant from the lubricant chamber, said nozzle having a trap shaped discharge passage therein of such proportions that air cannot bypass lubricant in said passage, said nozzle having a tip portion of reduced diameter through which the outlet end of the passage opens to obviate the accumulation of lubricant around the nozzle, and an apertured and passaged air chamber support for the housing to mount the lubricator on a device to be lubricated.

14. An automatic lubricator comprising a housing having a closed air chamber therein, passaged means for supporting the housing on a bearing to be lubricated, a lubricant reservoir on the housing, an air tube in said reservoir communicating between the housing air chamber and the space in the reservoir above the lubricant level, and means for varying the capacity of the air chamber.

15. An automatic lubricator comprising a housing having a closed air chamber therein, means for varying the capacity of the air chamber, passaged means for supporting the housing on a bearing to be lubricated, a lubricant reservoir on the housing, and passaged means communicating between the housing air chamber and the space in the reservoir above the lubricant level.

16. A lubricator comprising a housing including a lubricant chamber, an air-tight chamber and an air circulation chamber, pressure equalizing means between said lubricant chamber and said air-tight chamber, and means for discharging lubricant from the lubricant chamber into the air circulating chamber.

17. A lubricator comprising a lubricant reservoir, a supporting housing therefor having an air-tight chamber therein, pressure equalizing means between the reservoir and said housing, an auxiliary reservoir projecting through the housing and communicating with the interior of said reservoir, valve means in the reservoir for co-action with one end of the auxiliary reservoir, and a lubricant discharge nozzle secured on the opposite end of the auxiliary reservoir to hold the same secured in position.

18. An automatic lubricator including in combination a housing having a stationary partition wall dividing the housing into a lubricant chamber and an air tight chamber, a tube extending from the air tight chamber to above the lubricant level in the lubricant chamber, and a discharge tube for the lubricant chamber of such proportions that air cannot by-pass lubricant in the discharge tube.

19. An automatic lubricator including in combination a housing divided into a lubricant chamber and an air chamber, a support for the housing having an air circulation chamber therein, a lubricant feed device connecting the lubricant chamber with the air circulation chamber, and means within the lubricant chamber and extending into the first mentioned air chamber for controlling the passage of lubricant through said device.

20. A lubricator adapted to be placed on a bearing to be responsive to heat from the bearing, said lubricator comprising a casing having means defining a chamber providing a reservoir for lubricant and a first air chamber above the lubricant, and having means defining a second air chamber below the lubricant chamber, a conduit connecting said first and said second air chambers for air flow, and a lubricant outlet conduit connected to said lubricant reservoir and having a portion defining a trap with a bore proportioned so that air cannot bypass lubricant in said trap.

21. An automatic lubricator adapted to be placed on a bearing to be responsive as a unit to heat from the bearing, said lubricator comprising a casing having a stationary partition therein to define a chamber for lubricant and an air tight chamber in said casing, said air tight chamber having a passage for communication with the space above the lubricant in the lubricant chamber, and means adjustable to vary the volumetric air capacity of the air tight chamber to change the rate of feed of lubricant from the lubricator.

HILMER N. EKBOM.